10/15/85 XR 4,547,222

United States Patent [19]

Marinelli

[11] Patent Number: 4,547,222

[45] Date of Patent: Oct. 15, 1985

[54] HIGH PRINT INTENSITY MARKING FLUID

[75] Inventor: Nicola Marinelli, Dayton, Ohio

[73] Assignee: NCR Corporation, Dayton, Ohio

[21] Appl. No.: 612,487

[22] Filed: May 21, 1984

[51] Int. Cl.[4] ...................... C09D 11/00; G01D 15/06

[52] U.S. Cl. ...................................... 106/21; 106/22; 346/213; 346/218; 346/221; 427/150; 427/151

[58] Field of Search .................. 106/21; 346/213, 218, 346/221; 427/150, 151

[56] References Cited

U.S. PATENT DOCUMENTS

| | | | |
|---|---|---|---|
| 3,940,275 | 2/1976 | Brockett et al. | 106/19 |
| 4,012,554 | 3/1977 | Miller et al. | 106/22 |
| 4,275,905 | 6/1981 | Miller | 106/21 |

*Primary Examiner*—Paul Lieberman
*Assistant Examiner*—John F. McNally
*Attorney, Agent, or Firm*—Wilbert Hawk, Jr.; George J. Muckenthaler

[57] ABSTRACT

A liquid internal phase for use in encapsulated particles to produce high intensity marks includes an organic solvent having a specific amount of colorless chromogenic material and a larger amount of alkylated benzene material to yield a blue mark, and a specific amount of colorless chromogenic material and a lesser amount of alkylated benzene material to yield a black mark.

4 Claims, No Drawings

HIGH PRINT INTENSITY MARKING FLUID

BACKGROUND OF THE INVENTION

In the field of thermal printing and the use of heat-sensitive, coated paper or like record material in the printing operation, the coating formulation or the formulation of the substrate itself includes dyes or dye solutions which affect the quality of print and usefulness of the paper. As is well-known in the impact printing art, the carbonless paper, which is useful for transferring ink material to one or more additional sheets, is generally coated with microscopic capsules containing at least one of the reactive ingredients which reacts with another material to produce the mark that is initiated by an impact element against the paper and which impact element causes eruption of the capsules and release of the ink material.

In a typical and well-known arrangement, a top or first sheet of a manifold of sheets may include a coating on the back surface thereof and such sheet is referred to as a "CB" sheet, one or more intermediate sheets may include a coating on the front surface and a coating on the back surface and which are termed "CFB" sheets, and the bottom or last sheet has a coating on the front surface and is referred to as a "CF" sheet. The direct impact on the top or CB sheet causes a mark thereon to be transferred by rupturing the capsules on the back thereof, the CFB sheet causes formation of the mark by reaction with the coating on the front and transfer of such mark through rupture of the capsules on the back of the intermediate sheet, and the CF sheet is marked by reaction with the coating on the front thereof in a manner to provide the mark on all sheets. The color forming or precursor ingredient of the CB capsules reacts with the color developing ingredient of the CF coating to produce the mark or image.

It is in the area of the encapsulated dye solution or the internal phase liquid which has been and is being worked and developed to provide improved marking or printing on the record media. Prior knowledge of the make-up or composition of the dye solution or liquid indicates that monoisopropyl biphenyl (MIPB) is used as a dye solvent in "Trans/Rite" paper as manufactured by The Mead Corporation of Dayton, Ohio. Also, it is noted that "Santosol" is produced by Monsanto Company, St. Louis, Mo., and is acceptable as a solvent ingredient for use in the manufacture of carbonless paper. Further, it is known that Appleton Papers, Inc., Appleton, Wis., has included crystal violet lactone (CVL) blue dye and indolyl red (IR) dye to make a solution for blue printing, and that N-102 dye has been used in a formulation to provide an improved resistance to CB decline, which is the reduction in ability to produce a satisfactory image after accelerated light exposure.

Representative documentation in the field of carbonless paper relative to the subject matter of the present invention includes U.S. Pat. No. 2,850,395, issued to B. K. Green on Sept. 2, 1958, which discloses a printing fluid containing a red dye and a preferred color reactant such as crystal violet lactone.

U.S. Pat. No. 3,525,630, issued to P. S. Phillips on Aug. 25, 1970, discloses a colorless ink to give a black print, the composition of the ink including an organic oil solution of crystal violet lactone, benzoyl leuco methylene blue, and a phthalide structure.

U.S. Pat. No. 3,681,390, issued to C. H. Lin on Aug. 1, 1972, discloses a chromogenic compound consisting of at least a dialkylamino fluoran of substantially colorless texture and reactive with a color developing or activating material to yield dark-colored substances.

U.S. Pat. No. 3,940,275, issued to B. W. Brockett et al. on Feb. 24, 1976, discloses record material and a colorless but colorable marking liquid composition of an organic oil solution of a colorless reactant comprising dimethylaminophthalide (CVL), phenothiazine, and methylfluoran in amounts to yield an apparent blue-colored mark.

U.S. Pat. No. 3,981,735, issued to M. Murata et al. on Sept. 21, 1976, discloses a colorless liquid ink composition comprising an organic peroxide compound dissolved in water insoluble organic oil and a color reactive dye material.

U.S. Pat. No. 4,001,140, issued to P. L. Foris et al. on Jan. 4, 1977, discloses capsule manufacture with an oily solution of colorable dye materials including crystal violet lactone (CVL) and indolyl red (IR) in a mixture of solvents for producing blue and black print.

U.S. Pat. No. 4,012,554, issued to R. E. Miller et al. on Mar. 15, 1977, discloses a colorless liquid ink or internal phase liquid for use in microcapsules, the composition being a solvent vehicle having colorless chromogenic material (CVL), color-developing reactant material (phenol), and the colored dye resulting from reaction between the chromogenic material and the reactant material.

And, U.S. Pat. No. 4,275,905, issued to R. E. Miller on June 30, 1981, discloses a substantially colorless marking liquid comprising a colorless chromogenic material (CVL), a solvent for the chromogenic material, and an additive such as Pyridyl Blue (PB) and a phenol for controlling CB decline.

SUMMARY OF THE INVENTION

The present invention relates to certain materials for use in making carbonless paper. More particularly, the invention is directed to the encapsulated dye solution or the internal phase liquid for use in microencapsulation techniques. The print capsules are provided in a coating on CB paper and include an internal ink composition of selected formulations to provide either blue or black print of high intensity on carbonless CF paper.

In the case of blue printing, the improved print intensity capsules include a color former or dye solution comprising an alkylated biphenyl solvent, a petroleum alkylate, and crystal violet lactone dye material, as a formulation itself or in combination with other dyes or dye solutions to achieve a preferred blue shade.

In the case of a dye solution for black printing, improved intensity capsules comprise alkylated biphenyl solvent, petroleum alkylate, and methylfluoran black dye, as a formulation itself or in combination with other dyes or dye solutions to achieve a desired black shade.

In accordance with the above discussion, the principal object of the present invention is to provide a substantially colorless ink which yields a distinctive marking color on exposure to color developing conditions.

Another object of the present invention is to provide a marking liquid composition which prevents or substantially minimizes decline in the coating on carbonless paper in view of exposure thereof to light.

An additional object of the present invention is to provide an ink formulation for use in microencapsulated carbonless paper that displays an improved print intensity.

A further object of the present invention is to provide an internal phase liquid for microcapsules that include ingredients mixed in different portions or percentages for accomplishing blue or black high intensity print.

Additional advantages and features of the present invention will become apparent and fully understood from a reading of the following description.

DESCRIPTION OF THE PREFERRED EMBODIMENT

Prior to describing the composition of the marking liquid of the present invention, it should be noted that research and development work has included the use of crystal violet lactone (CVL) blue dye and indolyl red (IR) dye to provide a color former solution or oily dye formulation for obtaining blue print. Representative samples of such blue printing included the use of 15 pound CB paper on both 15 pound and 33 pound CF paper, both samples providing a certain print intensity of acceptable quality. The ingredients of the capsular internal phase liquid being used in such samples are disclosed in above-mentioned Foris et al. U.S. Pat. No. 4,001,140.

In the case of black print, a representative sample included the use of 15 pound CB paper on 15 pound CF paper and mixing the ingredients of the Foris et al. disclosure in relative percentages to yield the black print.

The coating of an exemplary CF sheet generally includes a phenolic resin or like color developing material which is reactive with the dyes or like color forming materials, kaolin clays or other ingredients in the binder material. When a CB sheet and a CF sheet are placed in coated face-to-coated-face relation and pressure is applied, the capsules of the CB sheet are ruptured and the encapsulated material or internal phase liquid is transferred to and reacts with the acid component of the CF sheet to yield a color.

One of the tests associated with such rupture of the CB capsules and color formation is the dropping weight, reflectance density, test which is a measure of the response of carbonless paper to a deliberate marking pressure and therefore the intensity of the resulting print. In this test, a standard one-half inch diameter circular pattern is formed on a CF-CB (coated front and coated back) pair of sheets by means of a weight-dropping instrument. After a color development time period of about twenty minutes, the reflectance density of the circular area is measured by means of a Macbeth RD-400 reflectance densitometer. The reflectance density of the color developed circular area is a measure of the color development on the CF sheet. A high reflectance reading on the densitometer indicates a preferred, more intense image or one of good color development, whereas a low densitometer reading indicates a light or less intense image and poor color development.

EXAMPLE 1

Example 1 is a marking liquid formulation or composition which is encapsulated and applied to a substrate for forming a CB sheet, and yielding a blue-appearing mark of improved intensity upon rupture of the capsules.

| Material | Percent Dry Weight |
|---|---|
| Sur-Sol 290 | 33 |
| Alkylate 215 | 64 |
| CVL Dye | 3 |

EXAMPLE 2

Example 2 is another marking liquid formulation or composition which is encapsulated and applied to a substrate for forming a CB sheet, and upon rupture of the capsules yielding a blue-appearing mark of improved intensity.

| Material | Percent Dry Weight |
|---|---|
| Sur-Sol 290 | 33 |
| Alkylate 215 | 64 |
| CVL Dye | 2.5 |
| Olive Green Dye | 0.5 |

Sur-Sol 290 is a trademark of Koch Chemical Company, Corpus Christi, Tex., for alkylated biphenyl solvent material. Alkylate 215 is a trademark of Monsanto Company, St. Louis, Mo., for petroleum alkylate dodecyl benzene or detergent intermediate material. The CVL dye is crystal violet lactone dye sold under the trademark Copikem 1 by Hilton-Davis Company, Cincinnati, Ohio. The olive green dye is sold under the trademark Pergascript Olive I-G by Ciba-Geigy Corporation, Greensboro, N.C.

EXAMPLE 3

Example 3 is a marking liquid formulation or composition which is encapsulated and applied to a substrate for forming a CB sheet and yielding a black-appearing mark of improved intensity upon rupture of the capsules.

| Material | Percent Dry Weight |
|---|---|
| Sur-Sol 290 | 76 |
| Alkylate 215 | 19 |
| N-102 Black Dye | 4.25 |
| CVL Dye | 0.25 |
| Indolyl Red Dye | 0.25 |
| Pergascript Olive Dye | 0.25 |

EXAMPLE 4

Example 4 is a marking liquid formulation or composition which is encapsulated and applied to a substrate for forming a CB sheet and yielding a black-appearing mark of improved intensity upon rupture of the capsules.

| Material | Percent Dry Weight |
|---|---|
| Sur-Sol 290 | 95.4 |
| N-102 Black Dye | 4.14 |
| Indolyl Red Dye | 0.23 |
| Olive Green Dye | 0.23 |

EXAMPLE 5

Example 5 is a marking liquid formulation or composition using certain of the ingredients of Example 3 for yielding a black-appearing mark.

| Material | Percent Dry Weight |
|---|---|
| Sur-Sol 290 | 76 |
| Alkylate 215 | 19 |
| N-102 Black Dye | 4.5 |
| CVL Dye | 0.5 |

The N-102 black dye is sold under the trademark Copikem 4 and Indolyl Red dye is sold under the trademark Copikem 3 by Hilton-Davis Company. While the olive dye is not an essential ingredient for accomplishing the improved print intensity, such dye accentuates the gloss of the types or printed characters.

The preferred composition for a blue-appearing mark is made in accordance with Example 1 formulation of one part of crystal violet lactone, about twenty parts of petroleum alkylate material and about ten parts of solvent material. The preferred composition for a black-appearing mark is made in accordance with either Example 3 or 5 formulation of one part of chromogenic material, about four parts of petroleum alkylate, and about fifteen parts of solvent.

Table 1 presents reflectance density data using the dropping weight instrument and the Macbeth RD-400 reflectance densitometer. In all test cases presented, the coating substrate was white paper and the CF paper was a standard 15 pound CF paper, as manufactured by Appleton Papers Inc. The RD-400 readings were taken at twenty minutes after the dropping weight application to the CB-CF paper pair being tested. Generally, an average reflectance density value was taken from eight applications of the dropping weight instrument. The higher values indicate high print intensity.

TABLE 1

| CB-CF Pair | Color | Reflectance Density |
|---|---|---|
| API 15#CB/API 15#CF (Control) | Blue | 54.5 |
| Example 1 15#CB/API 15#CF | Blue | 65 |
| Example 2 15#CB/API 15#CF | Blue | 67 |
| API 15#CB/API 15#CF (Control) | Black | 48 |
| Example 3 15#CB/API 15#CF | Black | 55 |
| Example 4 15#CB/API 15#CF | Black | 48 |
| Example 5 15#CB/API 15#CF | Black | 55 |

It is thus seen that herein described are formulations for a marking liquid for use as the internal phase of microcapsules in carbonless paper that provide a high intensity blue or black print. The present invention enables the accomplishment of the objects and advantages mentioned above, and while a preferred embodiment of the invention has been disclosed herein, variations thereof may occur to those skilled in the art. It is contemplated that all such variations and modifications not departing from the spirit and scope of the invention hereof are to be construed in accordance with the following claims.

I claim:

1. A marking liquid composition for yielding an apparent blue-colored mark of high print intensity comprising an organic solvent solution of
   about 3% by weight of crystal violet lactone,
   about 64% by weight of petroleum alkylate dodecyl benzene, and
   about 33% by weight of alkylated biphenyl.

2. A marking liquid composition for yielding a black-appearing mark of high print intensity comprising an organic solvent solution of
   about ½% by weight of crystal violet lactone,
   about 4½% by weight of methylfluoran black dye,
   about 19% by weight of petroleum alkylate dodecyl benzene, and
   about 76% by weight of alkylated biphenyl.

3. A liquid internal phase for use in a microcapsular-coated substrate to yield an apparent blue-colored mark of improved intensity, comprising a solution of
   about 33% by weight of alkylated biphenyl having dissolved therein about 2½% by weight of crystal violet lactone, about ½% by weight of olive green dye, and about 64% by weight of petroleum alkylate dodecyl benzene.

4. A liquid internal phase for use in microencapsulated particles to yield an apparent black mark of improved intensity, comprising a solution of
   about 76% by weight of alkylated biphenyl having dissolved therein about 4¼% by weight of N-102 black dye, about ¼% by weight of olive green dye, about ¼% by weight of indolyl red dye, about ¼% by weight of crystal violet lactone, and about 19% by weight of petroleum alkylate dodecyl benzene.

* * * * *